June 14, 1927.
P. R. BASSETT
1,632,161
ARC LAMP
Filed July 24, 1923
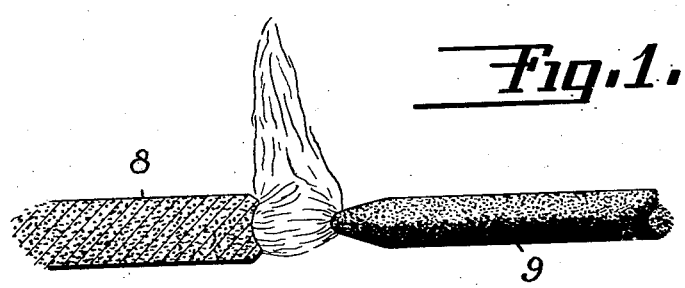
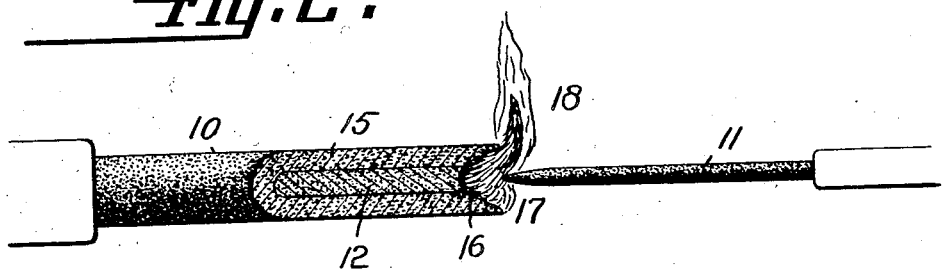
Inventor
Preston R. Bassett.
By his Attorney
Herbert H. Thompson Patented June 14, 1927.

1,632,161

UNITED STATES PATENT OFFICE.

PRESTON R. BASSETT, OF BROOKLYN, NEW YORK, ASSIGNOR TO THE SPERRY GYROSCOPE COMPANY, OF BROOKLYN, NEW YORK, A CORPORATION OF NEW YORK.

ARC LAMP.

Application filed July 24, 1923. Serial No. 653,414.

This invention relates to arc lamps of the type having a positive electrode and a negative electrode. The electric arc has been used as a source of light for many years. Its use as an illuminant may be divided into two classes, (1) as a source of high brilliancy, (2) as a source of high efficiency. The high brilliancy arc is made use of in optical systems, such as stereopticons, searchlights, motion picture projection apparatus, etc. The ordinary carbon arc has been used almost exclusively for this work since the positive crater is heated to the volatilizing point of carbon (3700° C.) and at this temperature it radiates 180 candle power per sq. mm. Since this is the most light that can be radiated from a solid it has stood at the top of the list of practical brilliance producers for many years.

For maximum efficiency of light production by electric arc another form of light emission is used, that is, luminescence from ionized vapor. This class of arcs is called flame arcs since the majority of light comes from the line and band spectrum of the flame. The intrinsic brilliancy of arc flames runs only from 1 to 20 candle power per mm. or only about 10% of the brightness of the positive crater of a carbon arc.

This invention has for its principal object the provision of method and means for the production of brightnesses greater than the carbon crater, by utilizing still another method of light production in the arc. The carbon arc crater is solid incandescence. The flaming arc is vapor luminescence. This invention covers flame incandescence. The difference between flame luminescence and flame incandescence is that the former is a discontinuous spectrum produced by ionized vapor and the latter is a continuous spectrum produced by actual minute incandescent particles in the flame. The best analogy is the ordinary Bunsen burner. With access of oxygen it gives the faint blue luminescent flame. With air shut off it gives the bright yellow flame caused by incandescent particles of carbon.

In order to obtain brightnesses greater than the carbon arc, a material must be produced in the flame which has a higher boiling point than the volatilizing point of carbon. The series of compounds called the carbides have exceedingly high boiling points, many of them exceeding by nearly 1000° C. the volatilizing point of carbon. These compounds have not been utilized for light production at high temperatures since they are liquids at temperatures over 3000° C. They also are very oxidizable and burn at red heat. Furthermore most of these high boiling point carbides are very unstable in the presence of moisture and hence cannot be used as such in electrodes. I have found that it is possible to produce these carbides chemically in the arc flame itself where they incandesce at great brilliancies, from 250 to 1200 candle power per sq. mm. They are immediately decomposed on leaving the arc and hence no accumulating supply of carbide is produced.

In order to produce incandescent carbides in an arc flame the following requisites have been discovered. (1) Carbon and a metal or metals must both be introduced from the anode in excessive quantities, that is, at a faster rate than is utilized in the production of ordinary flame arcs. (2) The arc flame must be concentrated or confined in some manner so that the carbide content cannot be decomposed into ions as fast as it is formed, (if this decomposition occurs the ordinary flame arc results).

It is a further object of my invention to provide an arc lamp capable of yielding a high intensity arc by the use of a current of low amperage.

A further object of my invention is the provision of an arc lamp employing a negative electrode which is of relatively small diameter compared to the positive electrode and crater so that very little shadow is cast by said negative electrode, and thus renders the lamp highly desirable for microscopic and surgical work.

Other objects and advantages of my improved electric arc lamp will become apparent in the following detailed description.

In the accompanying drawings,

Fig. 1 is a front elevation illustrating a pair of electrodes utilized in the ordinary flame arc.

Fig. 2 is an enlarged vertical section through a pair of electrodes embodying one form of my invention.

Referring to the drawings it will be seen that I have shown in Fig. 1 an ordinary flame arc having a brightness of about 10 candle power per sq. mm. at 30 amperes, and depending for its brightness upon the ionized vapor between the electrodes 8 and 9. In Fig. 2 is shown a pair of electrodes including a positive electrode 10 and a negative electrode 11. Said positive electrode is shown as provided with a core 12 of a material which in the presence of the high temperature adjacent the arc is more highly conductive than the outer shell 15, so that the material forming the core is utilized at a more rapid rate than the shell to form the crater 16 in which the intensely brilliant flame 17 is adapted to be confined by the proximity of the negative electrode and the flame issuing from the tip of the negative electrode 11. To form the crater the shell may be composed of a high grade lamp black without ash content. A shell of this type is not a good arcing material as it does not graphitize on the surface exposed to the arc flame. It therefore carries a minimum of current to the arc. This causes the shell to consume more slowly than the core and also forces most of the current to enter the arc through the core, thus providing an overload of current through the core. In the present instance, the negative electrode is in the form of a carbon needle of a diameter not greater than one third the diameter of the positive electrode and which can be moved up to the plane of the crater edge because of its small diameter, so that the flame from said negative electrode will impinge directly against the positive flame to confine the latter. The needle electrode by virtue of its position closely adjacent the positive crater permits the use of a current of very low amperage which is highly desirable, because in spite of the low amperage, there is nevertheless produced a high intensity arc which may be employed in special projection work where great brilliancy, low amperage and lack of shadow from the negative electrode is highly desirable. The small-diameter electrode prevents condensation of arc products on its tip since it can be run at a temperature which will revolatilize condensation products as fast as deposited. A large-diameter negative in its place would be sufficiently cool to condense graphite from the arc to an extent which would completely fill the crater mouth.

The core of the positive electrode 10 may be composed of a hard-baked mixture of carbon and a metal or metal salt adapted to react in the heat of the arc to form a carbide having a higher volatilization point than carbon, i. e., a volatilization point above 4000° C. Suitable metals are, e. g., the rare-earth elements, and examples of suitable salts are the chlorides, fluorides, and oxides of these elements. Since most of the current through the positive electrode is forced through the core, as hereinbefore described, the core is overloaded, thus producing an excess of carbon and metal (or metallic salt) in the arc to form carbides. The arc length when viewed from the side appears to be zero, but a cross-sectional view shows an arc length equal to the crater depth, the arc flame being almost wholly confined in the crater by the negative electrode. The carbide is decomposed again in the tail flame protruding from the upper part of the crater. As the flame escapes it finally mingles with the oxygen of the air, burning the carbon to carbon dioxide and redepositing the original metal or metal salt in the form of a white powder. This decomposition prevents the deposition of carbide on the electrode tip. The small negative electrode tip, as hereinbefore stated, prevents condensation of graphite from the arc thereon to an extent which would eventually seal the crater mouth. The chemical reactions involved may be illustrated as follows:

$$RF_x + xC = RC_x + xF^{ion}$$

where R is any of the metals hereinbefore stated as suitable for the purpose, the fluoride being chosen for the purpose of illustration. Further along in the arc, the carbide partially decomposes in the arc, as follows:

$$xRC_x = RC_x + R^{ion} + xC^{ion}$$

This decomposed carbide adds the bright line spectrum of the metal ions to the bright continuous spectrum of the carbide and hence enhances the total brightness.

After leaving the crater the flame in contact with air reacts as follows:

$$R^{ion} + C^{ion} + 3F^{ion} + O_2 = RF_3 + CO_2$$

the fluoride being in the form of a white deposit, while the $CO_2$ escapes into the air.

My invention therefore comprises broadly the formation of an incandescent flame where the solid particles contained therein are of a material having a volatilizing point higher than that of carbon.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having herein described what I claim and desire to secure by Letters Patent is:

1. In an arc lamp, a cored positive electrode, the core containing carbon and a metal salt which are capable of forming a high boiling point carbide and the shell being of pure carbon, and means for operating the electrode at a sufficient current density to overload the core for the purpose specified.

2. In an arc lamp, an anode having two parts comprising a pure, hard carbon shell and a soft carbon core impregnated with a metallic salt capable of forming a high boiling point carbide which readily graphitizes in the arc, and a negative electrode which operates at a temperature which does not permit the accumulation of graphite on its tip at short arc length.

3. In an arc lamp, an electrode having an outer shell and an inner core, said core being composed of a mixture of carbon and a salt of a rare earth adapted to react with the carbon to form a carbide having a volatilization point higher than that of carbon, said core under the heat of the arc having a greater electrical conductivity than the shell and means for operating said electrode at sufficient current density to overload the core for the purpose specified.

4. In an arc lamp, a cored positive electrode, the core containing carbon and a metal salt which are capable of forming a high boiling point carbide and the shell being of pure carbon and adapted when operated to form a crater, a negative electrode of relatively small diameter and formed of pure carbon, means for opearting the arc at sufficient current density to overload the core of the positive electrode and the negative electrode with the end of the latter positioned substantially in the plane of the crater edge of the former.

In testimony whereof I have affixed my signature.

PRESTON R. BASSETT.